United States Patent
Ehmer et al.

(10) Patent No.: US 6,474,149 B1
(45) Date of Patent: Nov. 5, 2002

(54) METHOD AND APPARATUS FOR DETECTING A DEFECTIVE PRESSURE SWITCH

(75) Inventors: Norbert Ehmer, Eschborn; Thomas Proger, Rodermark; Markus Zenzen, Hattersheim, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/180,165

(22) PCT Filed: May 6, 1997

(86) PCT No.: PCT/EP97/02294

§ 371 (c)(1),
(2), (4) Date: Mar. 1, 1999

(87) PCT Pub. No.: WO97/43156

PCT Pub. Date: Nov. 20, 1997

(30) Foreign Application Priority Data

May 11, 1996 (DE) .......................................... 196 19 200

(51) Int. Cl.$^7$ .............................................. G01L 5/28
(52) U.S. Cl. ....................................................... 73/121
(58) Field of Search ..................... 73/129, 121; 74/866; 307/112–131

(56) References Cited

U.S. PATENT DOCUMENTS

| | | | | |
|---|---|---|---|---|
| 4,041,809 A | * | 8/1977 | Dick et al. ..................... | 74/866 |
| 4,520,663 A | * | 6/1985 | Moore et al. ................. | 73/129 |
| 4,567,757 A | * | 2/1986 | Melocik et al. ............... | 73/129 |
| 4,682,824 A | * | 7/1987 | Burgdorf et al. .............. | 303/92 |
| 4,771,387 A | * | 9/1988 | Hexel et al. .................. | 73/121 |
| 4,869,558 A | * | 9/1989 | Yoshino ....................... | 303/92 |
| 5,000,520 A | * | 3/1991 | Schmitt ........................ | 303/10 |
| 5,417,485 A | * | 5/1995 | Burgdorf et al. ............. | 303/119.1 |

FOREIGN PATENT DOCUMENTS

| | | |
|---|---|---|
| DE | 34 27 380 | 1/1986 |
| DE | 03 10 113 | 4/1989 |
| DE | 38 33 473 | 4/1990 |
| DE | 93 00 238 | 1/1993 |

OTHER PUBLICATIONS

Search Report of the German Patent Office Relating to Parent German Patent Application No. 196 19 200.5 filed Sep. 25, 1996.

* cited by examiner

Primary Examiner—Benjamin R. Fuller
Assistant Examiner—Maurice Stevens
(74) Attorney, Agent, or Firm—Rader, Fishman & Grauer PLLC

(57) ABSTRACT

The invention provides a method of detecting a defective condition on a pressure switch arrangement which at least assumes a defective condition on the said pressure switch assembly whenever a signal arrives at an input of an electronic computing unit which cannot be associated either to the opened or to the closed condition of the pressure switch. Moreover, a defective condition on the pressure switch arrangement mounted in the brake system of a vehicle is assumed, once the pressure switch signal refers to an actuated brake although the vehicle is significantly accelerated. Conversely, a defective condition is also assumed if the vehicle significantly decelerates although the pressure switch signal refers to a lack of brake pressure. Also, an appropriate pressure switch arrangement is provided which, with the pressure switch closed, generates a rectangular signal and, with the pressure switch opened, generates a high level on the input II of an electronic computing unit. With an incoming low level, an error on the pressure switch arrangement is assumed.

7 Claims, 1 Drawing Sheet

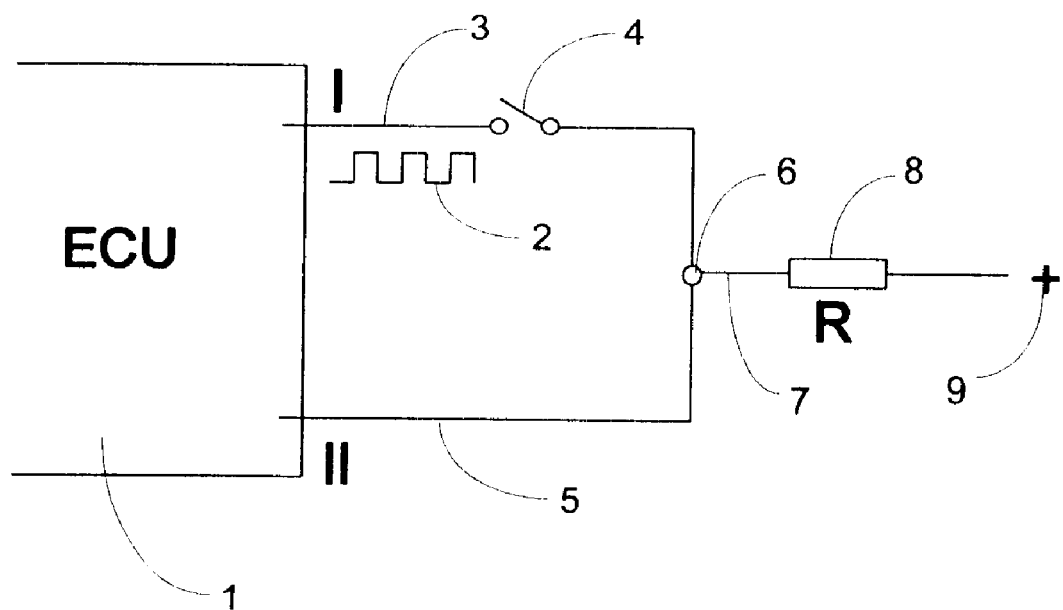

METHOD AND APPARATUS FOR DETECTING A DEFECTIVE PRESSURE SWITCH

BACKGROUND OF THE INVENTION

The present invention relates to a method of detecting a defective condition on a pressure switch assembly and to an arrangement for detecting a defective condition of a pressure switch assembly.

Pressure switches of the afore-mentioned type are mounted, for example, in automotive vehicles comprising a front axle/rear axle brake circuit division. In the event of a brake circuit failure on the front axle, they insure that a brake pressure reduction on the rear axle for adjusting the ideal brake force distribution in that case be prevented from occurring. As a rule, a pressure switch, with the brake not actuated, is closed and is opened by the brake pressure. Hence, if the pressure switch during a deceleration process, for example, with the brake light switch actuated, remains closed, this is indicative of that no pressure is built up in the front axle brake circuit. The brake circuit is defective. In order that the ECE directive requiring a 30% deceleration of the vehicle in the event of a brake circuit failure, can also be complied with by the rear axle brake circuit alone, in such an event of a detected defective condition of the front axle brake circuit, a brake force distribution is prevented by a conventional brake pressure reducer lockable by electrical means, or by cutting off a means for the electronic brake force distribution. Hence, a brake force control can be performed only with the pressure switch opened because this alone will insure that pressure is built up in the front axle. Should the pressure switch be opened only on account of a defective condition, also in a defective front axle brake circuit a brake pressure reduction would take place on the rear axle so that the required deceleration of the automotive could not be attained. For safety reasons, also other defective conditions of the pressure switch should be detected. It is the object of the invention to provide a method of the afore-mentioned type as well as an appertaining pressure switch assembly, which method enables detection of a defective condition of the pressure switch arrangement.

SUMMARY OF THE INVENTION

A method solving the afore-described problem is described by the present invention. A pressure switch arrangement generating corresponding controllable signals is also part of the present invention.

An error is recognized in the simplest way if the signal transmitted by the pressure switch arrangement to the controller does not fit with one or the other operating condition of the brake.

In the event that, additionally, an acceleration of the vehicle is detected or computed, there is another capability to check, in response to the acceleration, the plausibility of the signal currently generated by the pressure switch. Non-plausible is, for example, the display of an actuation of the brake although the vehicle significantly accelerates. An acceleration of the vehicle of at least approximately 0.2 g is deemed a significant acceleration.

Conversely, also a non-plausible signal is available if the pressure switch displays lack of brake pressure although the vehicle significantly decelerates, especially so if actuation of the brake is displayed on account of an electronic brake pressure regulation or a brake light switch. A significant deceleration in this respect is a deceleration that cannot be attained by the rear axle brake circuit alone so that it will have to be assumed that a brake pressure has been built up in the front axle brake circuit contrary to the signal generated by the pressure circuit which applies in the event of a deceleration from about 0.6 g onward.

With a defective condition of the pressure switch detected, it is advisable to activate an optical display, such as a pilot lamp.

Also, an emergency function of a brake slip control or of another electronic brake pressure control can be released. However, also in that case the driver should be warned as in an actual failure of the front axle brake circuit no additional detection of the defective condition will occur.

The pressure circuit arrangement according to the present invention is able to generate three different signals, depending on the operating condition of the pressure switch. A pulsated signal indicates a pressure built-up, a constantly high level is indicative of a non-pressurized brake circuit, while a constantly low level indicates a mass short circuit.

The invention will now be described more closely with reference to one form of embodiment in conjunction with the drawing.

BRIEF DESCRIPTION OF THE DRAWINGS

The single depict shows a pressure switch assembly of the invention.

DETAILED DESCRIPTION OF THE DRAWINGS

The electronic computing unit 1 designated by ECU includes two connectors I and II for the pressure switch arrangement. Connector I is an output on which is generated a rectangular signal 2. Inserted into the conduit branch 3 in communication with connector I is a pressure switch 4. The pressure switch 4, in its basic position, is closed and is opened by the hydraulic pressure that has built up.

The second connector II is an input to the electronic computing unit. The conduit branch 5 in communication with the connector II extends to a junction point 6 to which is also connected the conduit branch 3. Moreover, connected to junction point 6 is a conduit 7 inserted in which is a so-called "pull-up resistor" 8 which is designated by reference character R. The conduit 7 connects the junction point 6 to the plus pole 9 of a constant voltage source, for example, a vehicle battery.

With the pressure switch 4 closed, the rectangular signal 2 arrives at connector II. With the pressure switch 4 opened, a high level is applied to connector II on account of the pull-up resistor 8 in communication with the constant voltage source.

If, with the pressure switch opened, a mass short circuit has occurred in conduit 5, a low level will arrive at connector II which, should this condition prevail for a certain period of time, would be indicative of a defective pressure switch, because the rectangular signal 2 exhibits low levels for very short periods of time only. With a pressure switch closed, low level would equally arrive at connector II, should a mass short circuit have occurred somewhere between connector I and connector II. Also in that case, a defective pressure switch will be recognized. However, if in lieu of a mass short circuit a plus exists between connectors I and II, for example, on account of a defective condition of the pull-up resistor 8, this would not result in detection of an error of the pressure switch assembly according to the method of the invention.

Additional plausibility checks are, therefore, provided.

If the vehicle, over a predetermined period of time, passes through an acceleration of at least 0.2 g, it will be checked whether the pressure switch is open, i.e. whether a high level arrives at connector II. Should this be the case, the pressure switch or the pressure switch arrangement would be deemed defective because an open pressure switch refers to an actuated brake.

Conversely, with a permanently closed pressure switch, which is indicative of that the brake is not applied, the vehicle deceleration is watched. If in that case the vehicle is decelerated by more than 0.6 g and if this condition continues for a predetermined time without opening the pressure switch, the pressure switch is also deemed defective because such a significant vehicle deceleration can only be achieved by two intact brake circuits. This will especially apply, if additional parameters are indicative of an actuation of the brake, such as actuated brake light switch or electronic brake pressure control in anti-locking operation, etc.

This error detection of the pressure switch arrangement can, of course, also be employed with such pressure switches that are closed upon actuation of the brake. In that case only the signals for the actuated and non-actuated brake will be exchanged.

In all three checks of the pressure switch assembly, the error detection results in activating the pilot lamp, which is intended to indicate to the driver that, for example, the function of an electronic brake force distribution is limited. The electronic brake force distribution must, therefore, be re-switched to a less sensitive control because in the event of an additional failure of the front axle brake circuit the standards nevertheless have to be fulfilled, according to which an adequate deceleration is to be achieved with the rear axle brake circuit alone. An anti-locking system can continue to work with no changes effected.

What is claimed is:

1. A method of detecting a defective condition of a pressure switch assembly arranged within a pressure fluid-actuated brake system of a vehicle which comprises:

the step of transmitting a first signal to an electronic computing unit if no brake pressure has built up;

the step of transmitting a second signal differing from the first signal to the electronic computing unit if a brake pressure has built up;

the first and second signals to the electronic computer unit by a single connecting conduit; and wherein the electronic computing unit indicates a defective condition for a pressure switch for a front axle/rear axle circuit division if a signal not corresponding to either the first or second signal is received.

2. A method according to claim 1, further comprising the step of activating an optical display if a defective condition is indicated.

3. A method according to claim 1, wherein if the second signal is transmitted to the electronic computing unit, the method further includes monitoring the second signal for a predetermined period of time while the vehicle significantly accelerates to indicate a defective condition.

4. A method according to claim 1, wherein if the first signal is transmitted to the electronic computing unit while the vehicle is so significantly decelerated that such a deceleration can be achieved only with two intact brake cicuits, the method further includes monitoring the first signal to indicate a defective condition.

5. The method of claim 1, wherein said first signal is a pulsated square signal to indicate a non-pressurized brake ciruit.

6. The method of claim 1, wherein said second signal is constantly high level signal to indicate a pressure build up.

7. An arrangement for detecting a defective condition of a pressure switch assembly located in a pressure fluid-actuated brake system and transmitting a first signal to an electronic computing system if no brake pressure has built up, and a second signal differing therefrom if brake pressure has built up, the arrangement comprising:

an electronic computing unit;

an output connecting conduit connected to an output port of the electronic computing unit, with a pulsated voltage being applied to the output port;

an input connecting conduit connected to an input port of the electronic computing unit;

the output connecting conduit and the input connecting conduit being connected to each other at a junction point;

a pressure switch provided in the output connecting conduit; and a pull-up resistor having a first end and a second end, the first end connected to the junction point and the second end connected to a constant voltage source, with a constant voltage being applied to the input port through the resistor.

* * * * *

UNITED STATES PATENT AND TRADEMARK OFFICE
CERTIFICATE OF CORRECTION

| | | |
|---|---|---|
| PATENT NO. | : 6,474,149 B1 | Page 1 of 1 |
| DATED | : November 5, 2002 | |
| INVENTOR(S) | : Norbert Ehmer, Thomas Proger and Markus Zenzen | |

It is certified that error appears in the above-identified patent and that said Letters Patent is hereby corrected as shown below:

<u>Column 4,</u>
Line 16, change "with two intact brake crcuits" to -- with two intact brake circuits --.

Signed and Sealed this

Eighth Day of April, 2003

JAMES E. ROGAN
*Director of the United States Patent and Trademark Office*